USO05433453A

United States Patent [19]
Dalton

[11] Patent Number: 5,433,453
[45] Date of Patent: Jul. 18, 1995

[54] ARTICULATED SNOUT RINGS HAVING SPACED TEETH

[75] Inventor: William S. Dalton, Chesterfield, Mass.

[73] Assignee: IMO Industries, Inc. Quabbin Division, Chicopee, Mass.

[21] Appl. No.: 204,959

[22] Filed: Mar. 2, 1994

[51] Int. Cl.6 .............................. F16J 15/08
[52] U.S. Cl. ..................... 277/26; 277/175; 277/208; 277/215; 415/134; 415/136
[58] Field of Search ............... 277/26, 174, 175, 193, 277/208, 214, 215, 236; 415/134, 135, 136

[56] References Cited

U.S. PATENT DOCUMENTS

| | | | |
|---|---|---|---|
| 1,254,720 | 1/1918 | Mummert | 277/215 X |
| 1,426,694 | 8/1922 | Weidenfeller | 277/214 X |
| 1,499,571 | 7/1924 | Davis | 277/215 |
| 2,287,884 | 6/1942 | Jominy | 277/215 X |
| 2,417,884 | 3/1947 | Overstreet | 277/208 X |
| 2,800,299 | 7/1957 | Sheppard et al. | 415/136 |
| 4,513,975 | 4/1985 | Hauser et al. | 277/22 |
| 4,702,671 | 10/1987 | Brinkman et al. | 415/136 X |
| 4,721,313 | 1/1988 | Pennink | 277/53 |
| 4,812,105 | 3/1989 | Heymann | 415/134 |
| 4,886,281 | 12/1989 | Ehrmann et al. | 277/47 |
| 4,976,444 | 12/1990 | Richards | 277/53 |
| 5,037,115 | 8/1991 | Brandon | 277/26 |
| 5,085,443 | 2/1992 | Richards | 277/53 |

Primary Examiner—William A. Cuchlinski, Jr.
Assistant Examiner—Scott W. Cummings
Attorney, Agent, or Firm—Ross, Ross & Flavin

[57] ABSTRACT

In a turbine inclusive of: a turbine shaft having a longitudinal axis, a steam pipe, a casing circumadjacent the pipe, the pipe and casing being shiftable in vertical and transverse and axial directions relative to the longitudinal axis of the shaft, and a seal assembly disposed between the pipe and casing and comprising a stack of interdigitated relatively large and small piston rings, each large ring loosely fitting inside the shell during nonoperative conditions and having teeth firmly and sealingly engaging the casing during operative conditions; and having a coefficient of thermal expansion greater than that of the casing for expanding at a rate faster than the expansion rate of the casing under a condition of increased temperature, each small ring loosely fitting around the pipe during nonoperative conditions and having teeth firmly and sealingly engaging the pipe during operative conditions; and having a coefficient of thermal expansion less than that of the pipe for expanding at a rate slower than the expansion rate of the pipe under a condition of increased temperature, with the large and small rings tightening upon the respective casing and pipe respectively under an increasing temperature condition and shrinking from the respective shell and pipe respectively under a decreasing temperature condition, and the teeth of the rings deforming to create a complete seal.

4 Claims, 3 Drawing Sheets

ARTICULATED SNOUT RINGS HAVING SPACED TEETH

BACKGROUND OF THE INVENTION

1. Field of the Invention

In steam turbines it is necessary to provide a sealed passage for steam between separate casings. Since the casings have different rates and magnitudes of thermal expansion, the seals must be capable of accepting vertical, axial, and transverse differential expansion relative to the axis of the turbine shaft, without permitting significant leakage.

2. Description of the Related Art

A common method of sealing employs a stack of piston rings that surround a pipe or snout that extends between the casings. The stack of piston rings alternate in size, with somewhat smaller rings that fit tightly to the snout being held between larger piston rings that are held in the bore of the casing such that the outer surface of the rings seal tightly to it. This method permits sliding motion of the pipe through the piston rings while maintaining a seal. It also permits transverse and axial motion of the pipe by sliding the small piston rings relative to the large piston rings, still maintaining a tight seal between the opposing large and small piston ring surfaces while the inner surface of the small piston rings and the outer surface of the large rings continue to seal tightly with the pipe and casing surfaces, respectively.

The rings must be fabricated from a high strength super alloy and must also have a coefficient of thermal expansion that is consistent with the pipe or snout material for the inner rings and a material that is consistent with the casing for the outer rings. The rings are made of a material whose surfaces form only thin oxide layers and that have a small coefficient of friction.

It has also been proposed to apply a high temperature dry film lubricant to the mating surfaces of the rings to reduce both the formation of oxides and to reduce the coefficient of friction.

Such arrangements are disclosed in U.S. Pat. No. 5,037,115, wherein it is stated: "With regard to the differential expansion coefficients identified above, the combination of initial clearance and differential growth must achieve a good seal for moderately low temperature, known to occur at start up, without incurring unsatisfactorily high stress and yielding or creeping at higher operating temperature", and ". . . a high temperature dry film lubricant is applied to the various sliding surfaces to further reduce friction and to further discourage the formation of oxide films on the ring, shell and pipe surfaces . . ."

The normal operating temperature of a steam turbine will be about 1000 DEG F if the inner or outer rings are designed for a close fit and seal at say 500 DEG F, then when the turbine reaches its normal operating temperature of 1000 DEG F, one or all of the following may occur:

1) Since the inner and outer rings are fabricated from super alloy type material, it is reasonable to assume that if the rings are designed to seal at 500 DEG F, as stated above, then when the turbine reaches its normal operating temperature of 1000 DEG F an excessive amount of stress will occur in both the pipe or snout and the casing. This type of stress could cause either the snout or the casing to crack, causing severe damage to some or all of the turbine parts.

2) If cracking does not occur as stated above, then as stated in U.S. Pat. No. 5,037,115, "This motion must take place without creating such high stress in the small rings as to cause permanent deformation and leakage. Leakage will occur if the rings become stretched and no longer seal against the pipe."

3) Another problem which is not accounted for in the above mentioned patent, or any other known prior art, is that the snout and the casing are not round at assembly, that is have not been machined to a true circle, as is the case in many instances.

Normal operating procedure during an overhaul is to remove the old rings and sand blast the mating surfaces, leaving a rough surface and not correcting any existing out-of-roundness. Such out-of-roundness of the snout or casing will allow for leakage.

4) The dry film lubricant coating is washed away by steam in a very short period of time.

SUMMARY OF THE INVENTION

The problems enumerated above are corrected by the invention hereof, wherein both the snout rings and the casing rings are provided with teeth, the rings still using the coefficient of thermal expansion to close and seal as in the prior art.

This new improved design of adding teeth to both the inner and outer rings solves the first and most critical problem: that of cracking either the snout or the casing in that the teeth deform upon closure to mate exactly with the snout or the casing with only enough force to effect a good seal.

The rings hereof can be designed to seal at a low temperature of say 500 DEG F during start up and as the temperature rises to the normal operating temperature of 1000 DEG F, the teeth will continue to deform, creating a complete seal without the danger of cracking either the snout or the casing.

The other problems stated above would also be eliminated since the teeth of the rings deform to create a complete seal. Thus, high stresses would not cause any deformation to the rings, only the teeth would deform to exactly match the mating part.

Additionally, any out of roundness would be compensated for by the deformation of the teeth.

As another feature of the invention, a thin film of chrome carbide is applied to the mating surfaces of the rings to reduce the build up of oxides and to reduce the coefficient of friction. Such a chrome carbide coating will last indefinitely.

DESCRIPTION OF THE PREFERRED EMBODIMENTS

Figure 1:
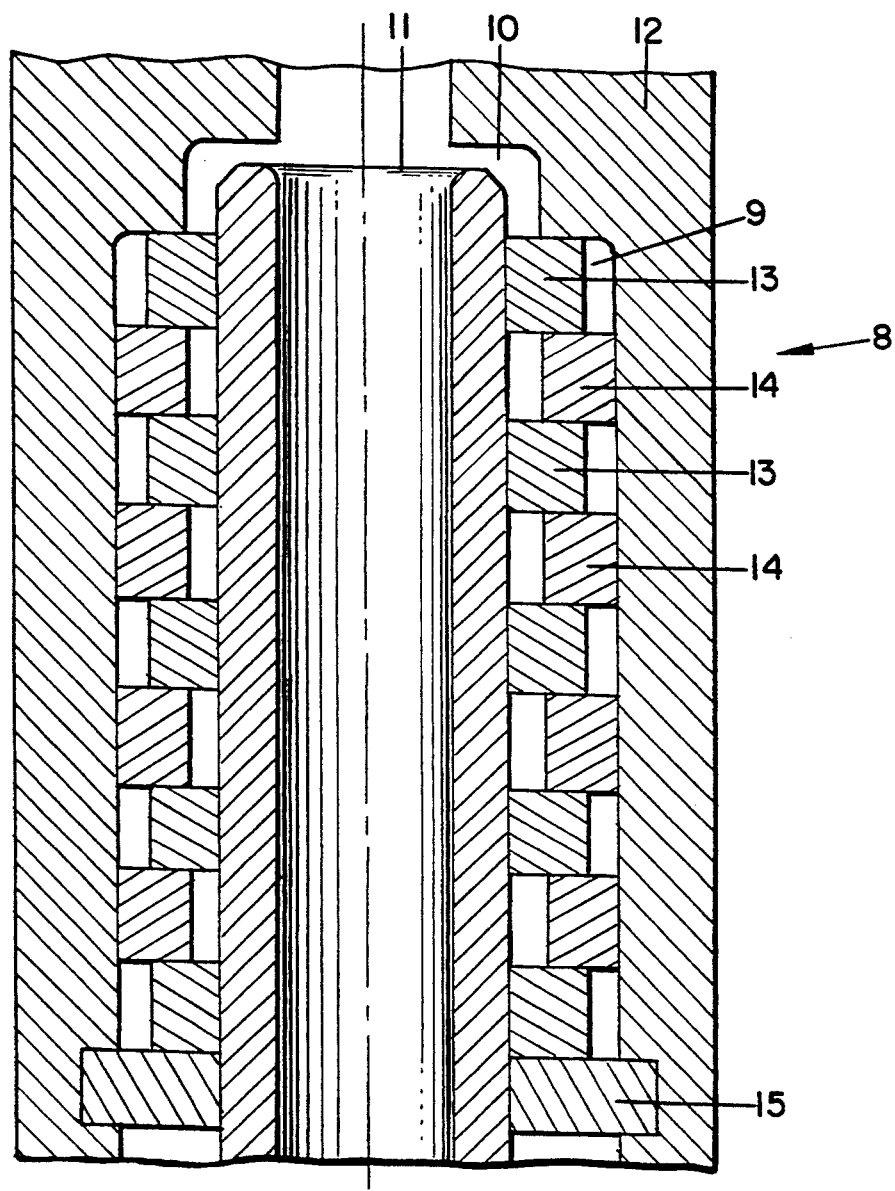
FIG. 1 is a fragmentary cross-sectional view of a prior art piston ring assembly incorporated in a steam turbine section in the zone where high pressure steam enters the turbine.

FIG. 1 is a fragmentary cross-sectional view of a typical prior art piston ring assembly 8 incorporated in the zone of a steam turbine section where high pressure steam is being passed through an outer casing 12 into an inner casing, not shown. Leakage of steam between the casings will be harmful to efficiency and turbine output. Frequently, there are multiple steam inlets, (not shown), in the same plane.

A snout or pipe 11 projects from the inner casing into a cylindrical opening 10 machined into outer casing 12.

Piston ring assembly 8 is mounted in an annular space 9 between pipe 11 and cylindrical opening 10 in outer casing 12, and comprises a plurality of small piston rings 13, which fit tightly on the outer periphery of pipe 11, essentially preventing steam leakage at that interface, and a plurality of large piston rings 14 which fit tightly against the wall of opening 9 in outer casing 12, essentially eliminating leakage at that interface.

The small and large piston rings are stacked one on the other in alternating manner and also have common contact surfaces on their upper and lower faces that prevent leakage between the adjacent piston rings.

The steam pressure inside pipe 11 will be higher than the pressure in the space between the inner and outer casings so a positive pressure compresses the rings together.

The rings held in position by a locking ring 15 provided in outer casing 12 and extending into opening 9. This ring is normally made in segments to facilitate assembly.

The steam pressure on the rings compresses the stack together, helping to minimize leakage, but also increasing friction at times when sliding is necessary. This occurs when the inner casing changes temperature relative to outer casing 12. Such changes occur during starting, shutdown and operation.

The inner casing can be expected to change the position of pipe 11 relative to outer casing 12 in all three directions: vertically, axially and transversely relative to the axis of the turbine shaft, not shown.

To permit such differential motion in the transverse, vertical and axial directions, small piston rings 13 must slide relative to large piston rings 14. This motion must take place without creating such high stress in the small rings as to cause permanent deformation and leakage. Leakage will occur if the rings become stretched and no longer seal against pipe 11.

As proposed in U.S. Pat. No. 5,037,115, piston rings 13 and 14 are made of materials whose surfaces form only thin oxide layers in the high temperature steam environment, and that have small coefficients of friction. The piston rings are made of materials whose thermal coefficient of expansion is somewhat smaller than the pipe material for the small rings and somewhat greater than the expansion coefficient of the casing for the large rings.

The arrangement described above has been in use for some time with only limited success.

Since the small rings 13 and large rings 14 are fabricated from super alloy type material, when the turbine reaches its normal operating temperature of 1000 DEG F an excessive amount of stress will occur in both pipe 11 and casing 12. This type of stress can cause either the pipe or the casing to crack, resulting in severe damage to some or all of the turbine parts.

Additionally, if pipe 11 and casing 12 are not round at assembly, that is they have not been machined to a true circle, leakage will occur.

The problems of the prior art structures are corrected by the invention hereof as shown in FIGS. 2-6, wherein the small and large rings are provided with teeth.

Figure 2:
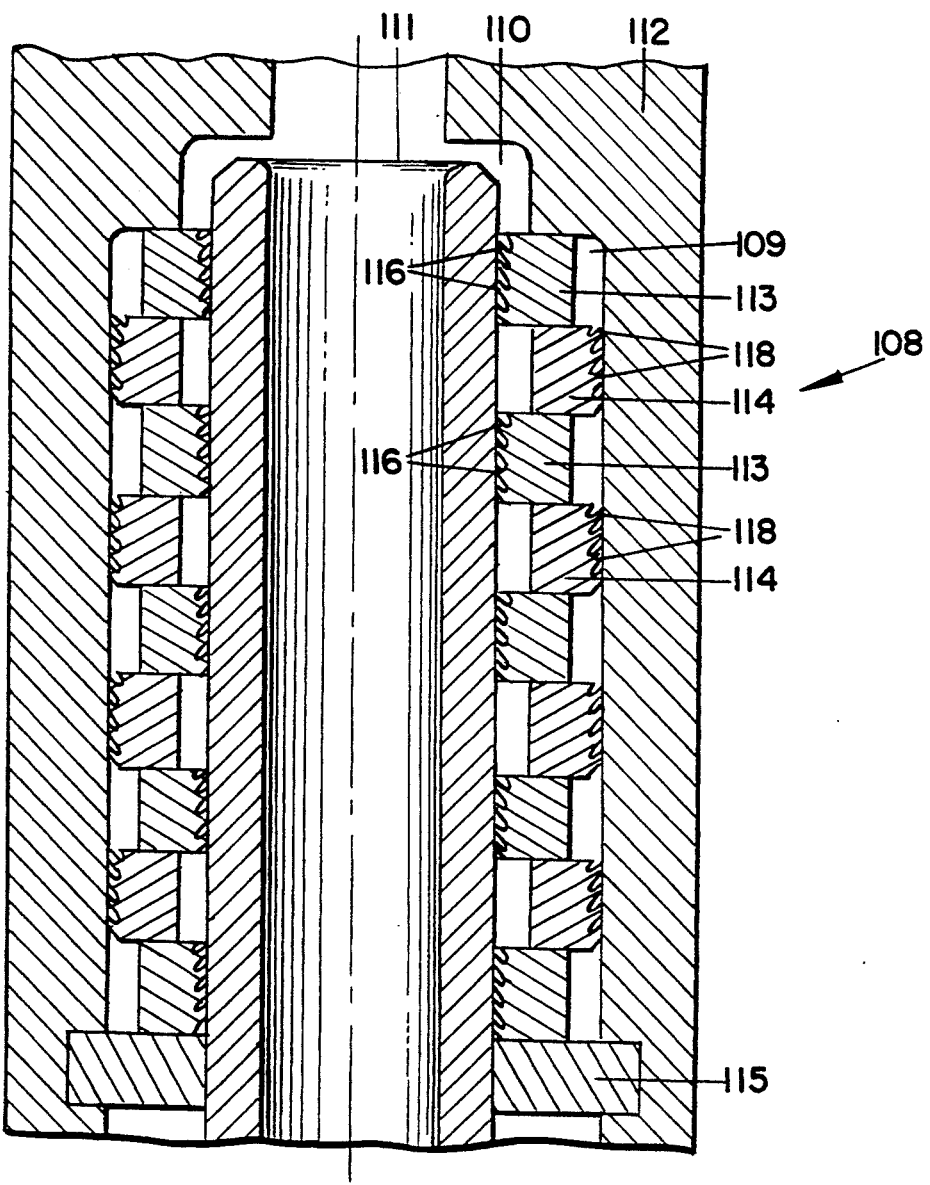
FIG. 2 is a similar cross-sectional view of a piston ring assembly incorporating the improvements of the invention.

FIG. 2 is a fragmentary, cross-sectional view, of a piston ring assembly 108 embodying a preferred form of the invention and incorporated in the zone of a steam turbine section where high pressure steam is being passed through an outer casing 112 into an inner casing, not shown. Leakage of steam between the casings will be harmful to efficiency and turbine output. There may be multiple steam inlets, (not shown), in the same plane.

A snout or pipe 111 projects from the inner casing into a cylindrical opening 110 machined into outer casing 112.

Piston ring assembly 108 is mounted in an annular space 109 between pipe 111 and cylindrical opening 110 in outer casing 112, and comprises a plurality of small piston rings 113, which fit tightly on the outer periphery of pipe 111, essentially preventing steam leakage at that interface, and a plurality of large piston rings 114 which fit tightly against the wall of opening 109 in outer casing 112, essentially eliminating leakage at that interface.

The small and large piston rings are stacked one on the other in alternating manner and also have common contact surfaces on their upper and lower faces that prevent leakage between the adjacent piston rings.

The steam pressure inside pipe 111 will be higher than the pressure in the space between the inner and outer casings, so a positive pressure compresses the rings together.

Rings 113 and 114 are held in position by a locking ring 115 provided in outer casing 112 and extending into opening 109. This ring is normally made in segments to facilitate assembly.

The steam pressure on the rings compresses the stack together, helping to minimize leakage, but also increasing friction at times when sliding is necessary. This occurs when the inner casing changes temperature relative to outer casing 112. Such changes occur during starting, shutdown and operation.

The inner casing can be expected to change the position of pipe 111 relative to outer casing 112 in all three directions: vertically, axially and transversely relative to the axis of the turbine shaft, not shown.

To permit such differential motion in the transverse, vertical and axial directions, small piston rings 113 must slide relative to large piston rings 114. This motion must take place without creating such high stress in the small rings as to cause permanent deformation and leakage. Leakage will occur if the rings become stretched and no longer seal against pipe 111.

Piston rings 113 and 114 are made of materials whose surfaces form only thin oxide layers in the high temperature steam environment, and that have small coefficients of friction.

The piston rings are made of materials whose thermal coefficient of expansion is somewhat smaller than than the pipe material for the small rings and somewhat greater than the expansion coefficient of the casing for the large rings.

Such materials may be selected from super alloy material or stainless steel.

So that the small and large piston rings are easily deformable, each is provided with teeth on the surfaces which contact the pipe and the casing.

Figure 4:
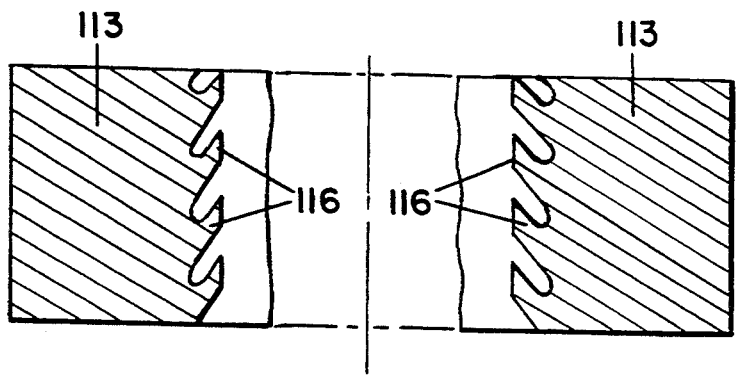
FIG. 4 is an enlarged, fragmentary, broken cross-sectional view of one of the small piston rings.

In the case of small rings 113, as best seen in FIGS. 2 and 4, a plurality of vertically spaced teeth 116 are provided on the inner periphery of each ring so as to be in bearing contact with the outer periphery of pipe 111.

Figure 3:
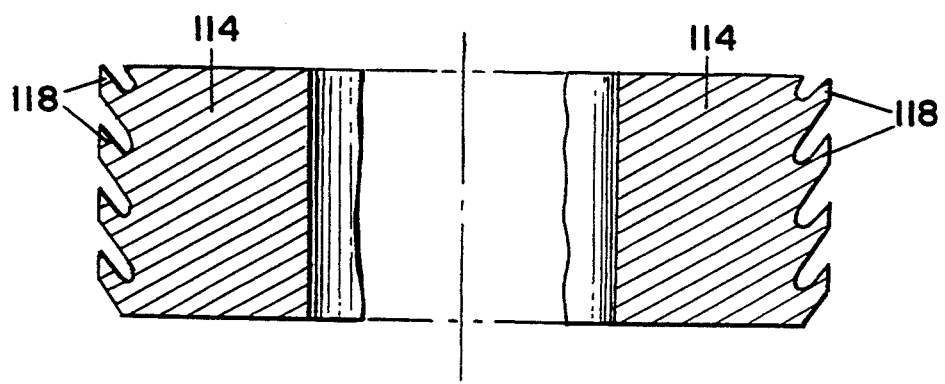
FIG. 3 is an enlarged, fragmentary, broken cross-sectional view of one of the large piston rings.

In the case of large rings 114, as best seen in FIGS. 2 and 3, a plurality of vertically spaced teeth 118 are provided on the outer periphery of each ring so as to be in bearing contact with the inner wall of casing 112.

Teeth 116 and 118 are preferably upwardly inclined so as to be more easily deformable.

The addition of teeth to both the small and large rings solves the critical problem of cracking of either pipe 111 or casing 112 in that the teeth deform upon closure to mate exactly with the pipe or the casing with only enough force to effect a good seal.

The rings hereof are designed to seal at a low temperature of approximately 500 DEG F during start up. As the temperature rises to a normal operating temperature of approximately 1000 DEG F, the teeth continue to deform, creating a complete seal with out the danger of cracking either the pipe or the casing.

The teeth of the rings deform to create a complete seal. Thus, high stresses will not cause any deformation to the rings, per se, only the teeth deform to exactly match the mating part.

Additionally, any out of roundness of the pipe or casing is compensated for by the deformation of the teeth.

Figure 5:
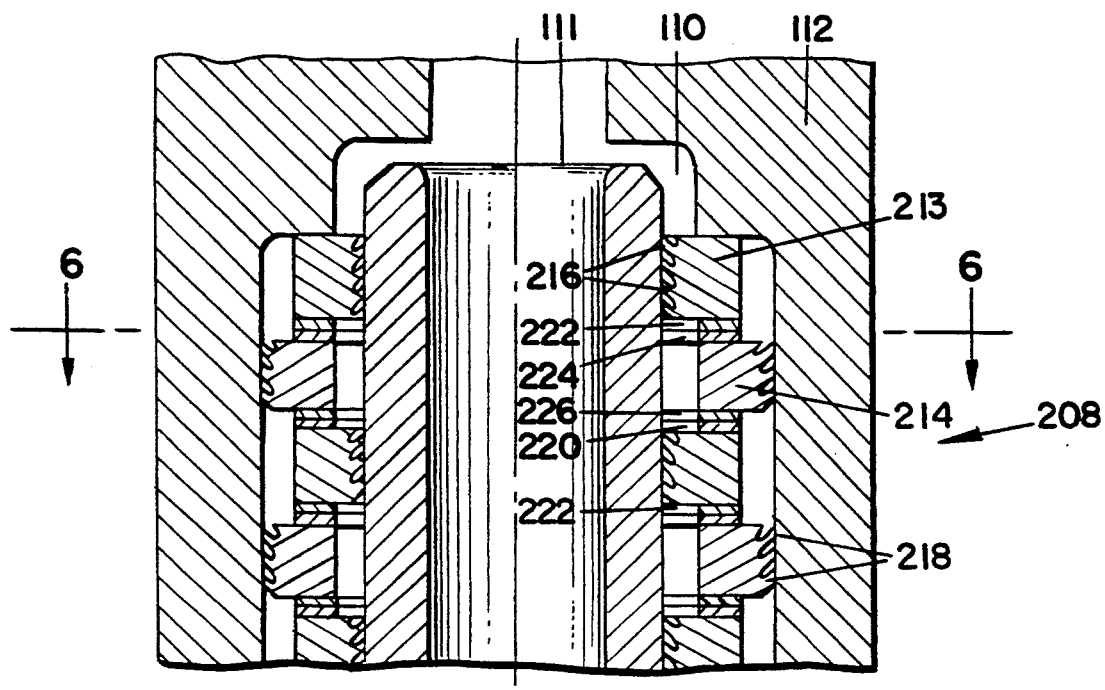
FIG. 5 is a fragmentary cross-sectional view similar to FIG. 2 of a modified form of the invention.
Figure 6:
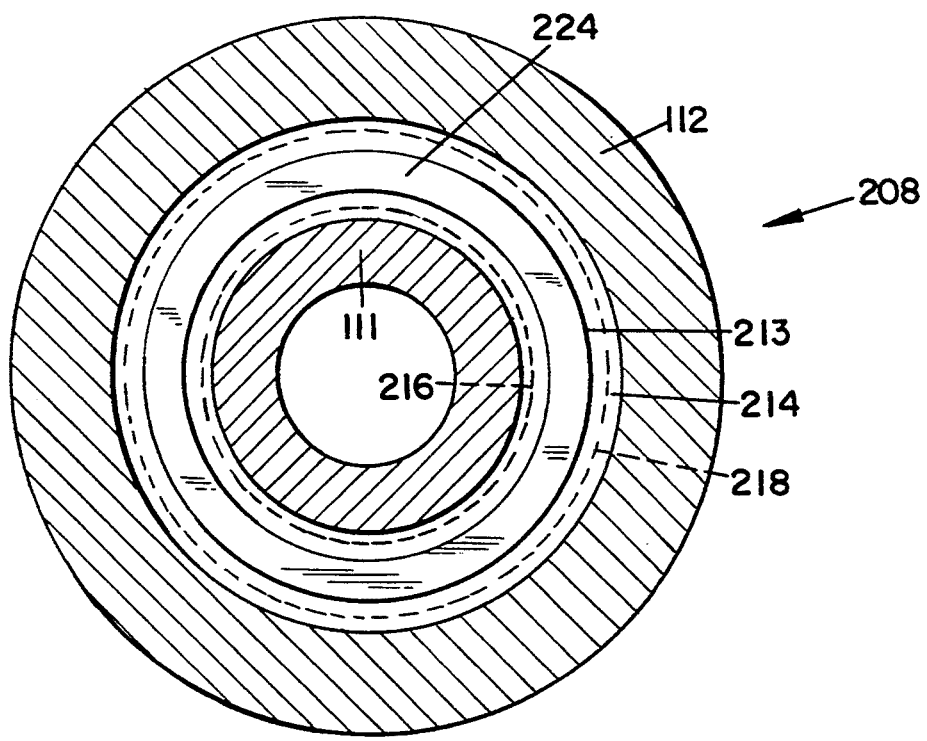
FIG. 6 is a cross-sectional view taken on line 6—6 of FIG. 5.

In the modified form of the invention as shown in FIGS. 5 and 6, the structure is identical to that of FIGS. 2-4 except that a piston ring assembly 208 comprising stacked small piston rings 213 having vertically spaced inner teeth 216 and large piston rings 214 having vertically spaced outer teeth 218 have thin coatings of chrome carbide applied to their mating faces.

Thin films or coatings of chrome carbide 220 and 222 are applied to the upper and lower faces respectively of toothed small rings 213.

Thin films or coatings of chrome carbide 224 and 226 are applied to the upper and lower faces respectively of large rings 214.

The coatings on the mating faces of the rings reduce the build up of oxides and reduce the coefficient of friction of the rings. Such chrome carbide coatings will last indefinitely.

I claim:

1. In a turbine inclusive of:
a turbine shaft having a longitudinal axis,
a steam pipe,
a casing circumadjacent the pipe,
the pipe and casing being shiftable in vertical and transverse and axial directions relative to the longitudinal axis of the shaft,
and a seal assembly disposed between the pipe and casing and comprising a stack of interdigitated relatively large and small piston rings,
the improvement comprising:
each large ring
(a) loosely fitting inside the shell during nonoperative conditions and having a plurality of spaced teeth firmly and sealingly engaging the casing during operative conditions; and
(b) having a coefficient of thermal expansion greater than that of the shell for expanding at a rate faster than the expansion rate of the shell under a condition of increased temperature,
each small ring
(a) loosely fitting around the pipe during nonoperative conditions and having a plurality of spaced teeth firmly and sealingly engaging the pipe during operative conditions; and
(b) having a coefficient of thermal expansion less than that of the pipe for expanding at a rate slower than the expansion rate of the pipe under a condition of increased temperature, with the large and small rings tightening upon the respective casing and pipe respectively under a decreasing temperature condition due to the relative coefficients of thermal expansion between the large and small rings and the respective casing and pipe, and the teeth of the rings deforming to provide a positive seal without the danger of cracking either the casing or pipe.

2. In a turbine as set forth in claim 1, wherein the piston rings are fabricated from stainless steel.

3. In a turbine as set forth in claim 1, wherein the teeth on the large and small piston rings are angularly upwardly inclined.

4. In a turbine as set forth in claim 1, the further improvement of a surface coating of a thin layer of chrome carbide on the mating faces of the large and small piston rings.

* * * * *